US006661494B1

(12) United States Patent
Dübal et al.

(10) Patent No.: US 6,661,494 B1
(45) Date of Patent: Dec. 9, 2003

(54) MONOSTABLE FERROELECTRIC ACTIVE MATRIX DISPLAY

(75) Inventors: Hans-Rolf Dübal, Eltville (DE); Rainer Wingen, Hattersheim (DE); Toshiaki Nonaka, Kakegawa (JP)

(73) Assignee: Aventis Research & Technologies GmbH & Co. KG, Frankfurt am Main ( * ) Notice: Subject to any disclaimer, the term of this patent is extended or adjusted under 35 U.S.C. 154(b) by 0 days.

(21) Appl. No.: 09/701,986

(22) PCT Filed: Jun. 8, 1999

(86) PCT No.: PCT/EP99/03941

§ 371 (c)(1), (2), (4) Date: Mar. 9, 2001

(87) PCT Pub. No.: WO99/64925

PCT Pub. Date: Dec. 16, 1999

(30) Foreign Application Priority Data

Jun. 8, 1998 (DE) .......................... 198 25 487

(51) Int. Cl.⁷ ...................... C09K 19/02; G02F 1/1335; G02F 1/135; G02F 1/136
(52) U.S. Cl. .......................... 349/172; 349/100; 349/49
(58) Field of Search ................. 349/172, 100, 349/49

(56) References Cited

U.S. PATENT DOCUMENTS

| | | | |
|---|---|---|---|
| 4,367,924 A | | 1/1983 | Clark et al. |
| 4,941,736 A | * | 7/1990 | Taniguchi et al. .......... 350/350 |
| 5,790,223 A | * | 8/1998 | Hanyu et al. ............... 349/184 |
| 6,310,677 B1 | * | 10/2001 | Togano et al. .............. 349/172 |
| 6,320,639 B1 | * | 11/2001 | Mori et al. ................. 349/155 |
| 6,344,889 B1 | * | 2/2002 | Hasegawa et al. ........... 349/129 |
| 6,368,679 B1 | * | 4/2002 | Schmidt et al. .............. 428/1.1 |
| 6,436,490 B1 | * | 8/2002 | Nishimura et al. ........... 428/1.1 |

FOREIGN PATENT DOCUMENTS

| | | | |
|---|---|---|---|
| EP | 0 032 362 | 7/1981 | |
| EP | 0455160 A2 | * 6/1991 | ........... G02F/1/137 |
| WO | WO 97/12355 | 4/1997 | |

OTHER PUBLICATIONS

Nito et al, "A Novel Surface–Stabalized Monostable Ferroelectric LCD", pp. 179–182, also referred to as XP000314350.
Matsui et al, "Novel Liquid Crystal Mixtures for a Surface–Stabilized Ferroelectric LCD", Liquid Crystals, 1997, vol. 23, No. 5, pp. 659–666.
Nito et al; "A Novel Surface–Stabilized Monostable Ferroelectric LCD"; 1991 IEEE. pp. 179–182.*
Matsui et al; "Novel Liquid Crystal Mixtures for a Surface–Stabilized ferroelectric LCD"; LiquidCrystal,1997, vol.23, No.5, pp. 659–666.*

* cited by examiner

Primary Examiner—Robert H. Kim
Assistant Examiner—Mike Qi
(74) Attorney, Agent, or Firm—Frommer Lawrence & Haug

(57) ABSTRACT

The monostable ferroelectric active matrix display comprises a liquid-crystal layer in the form of a monodomain having an unambiguously defined direction of the layer normal z of the smC* phase, the liquid-crystal layer preferably having a chevron C-1, chevron C-2 or bookshelf geometry.

10 Claims, No Drawings

MONOSTABLE FERROELECTRIC ACTIVE MATRIX DISPLAY

Replacement of the cathode ray tube with a flat panel screen requires a display technology which simultaneously makes it possible to achieve a high image resolution, i.e. more than 1000 lines, a high image brightness (>200 cd/m$^2$), a high contrast (>100:1), a high frame rate (>60 Hz), an adequate color representation (>16 million colors), a large image format (screen diagonal >40 cm), a low power consumption and a wide viewing angle, at low production costs. At present, there is no technology which fully satisfies all these features simultaneously.

Many manufacturers have developed screens which are based on nematic liquid crystals and have been used in recent years in the field of notebook PCs, Personal Digital Assistants, desktop monitors etc. Use is made here of the technologies STN (supertwisted nematics), AM-TN (active matrix—twisted nematics) AM-IPS (active matrix—in-plane switching) and AM-MVA (active matrix—multidomain vertically aligned), which are described in the relevant literature; see, for example, T. Tsukuda, TFT/LCD: Liquid Crystal Displays Addressed by Thin-Film Transistors, Gordon and Breach, 1996, ISBN 2-919875-01-9, and the references cited therein; SID Symposium 1997, ISSN-0097-966X pages 7 to 10, 15 to 18, 47 to 51, 213 to 216, 383 to 386, 397 to 404 and the references cited therein. Furthermore, use is being made of the technologies PDP (plasma display panel), PALC (plasma addressed liquid crystal), ELD (electroluminescent display), FED (field emission display) etc., which are also explained in the above-cited SID report.

Clark and Lagerwall (U.S. Pat. No. 4,367,924) have been able to show that the use of ferroelectric liquid crystals (FLCs) in very thin cells results in opto-electrical switching or display elements which have response times which are faster by a factor of up to 1000 compared with conventional TN ("twisted nematic") cells (see, for example, EP-A 0 032 362). Owing to this and other favorable properties, for example the possibility of bistable switching and the fact that the contrast is virtually independent of the viewing angle, FLCs are basically suitable for areas of application such as computer displays and TV sets, as shown by a monitor marketed in Japan by Canon since May 1995.

The use of FLCs in electro-optical or fully optical components requires either compounds which form smectic phases and are themselves optically active, or the induction of ferroelectric smectic phases by doping compounds which, although forming such smectic phases, are not themselves optically active, with optically active compounds. The desired phase should be stable over the broadest possible temperature range.

The individual pixels of an LC display are usually arranged in an x,y matrix formed by the arrangement of a series of electrodes (conductor tracks) along the rows and a series of electrodes along the columns on the upper or lower side of the display. The points of intersection of the horizontal (row) electrodes and the vertical (column) electrodes form addressable pixels.

This arrangement of the pixels is usually referred to as a passive matrix. For addressing, various multiplex schemes have been developed, as described, for example, in Displays 1993, Vol. 14, No. 2, pp. 86–93, and Kontakte 1993 (2), pp. 3–14. Passive matrix addressing has the advantage of simpler display production and consequently lower production costs, but the disadvantage that passive addressing can only be carried out line by line, which results in the addressing time for the entire screen with N lines being N times the line addressing time. For usual line addressing times of about 50 microseconds, this means a screen addressing time of about 60 milliseconds in, for example, the HDTV (high definition TV, 1152 lines) standard, i.e. a maximum frame rate of about 16 Hz, too slow for moving images. In addition, display of gray shades is difficult. At the FLC Conference in Brest, France (Jul. 20–24, 1997, see Abstract Book 6$^{th}$ International Conference on Ferroelectric Liquid Crystals, Brest/France), a passive FLC display with digital gray shades was shown by Mizutani et al., in which each of the RGB pixels (RGB=red, green, blue) was divided into sub-pixels, allowing the display of gray shades in digital form through partial switching. Using three basic colors (red, green, blue), N gray shades result in $3^N$ colors. The disadvantage of this method is the considerable increase in the number of screen drivers necessary and thus in the costs. In the case of the display shown in Brest, three times the number of drivers were necessary than in a standard FLC display without digital gray shades.

In so-called active matrix technology (AMLCD), a non-structured substrate is usually combined with an active matrix substrate. An electrically non-linear element, for example a thin-film transistor, is integrated into each pixel of the active matrix substrate. The nonlinear elements can also be diodes, metal-insulator-metal and similar elements, which are advantageously produced by thin-film processes and are described in the relevant literature; see, for example, T. Tsukuda, TFT/LCD: Liquid Crystal Displays Addressed by Thin-Film Transistors, Gordon and Breach, 1996, ISBN 2-919875-01-9, and the references cited therein.

Active matrix LCDs are usually operated with nematic liquid crystals in TN (twisted nematics), ECB (electrically controlled birefringence), VA (vertically aligned) or IPS (in-plane switching) mode. In each case, the active matrix generates an electric field of individual strength on each pixel, producing a change in alignment and thus a change in birefringence, which is in turn visible in polarized light. A severe disadvantage of these processes is the poor video capability owing to excessively slow response times of nematic liquid crystals.

For this and other reasons, liquid crystal displays based on a combination of ferroelectric liquid crystal materials and active matrix elements have been proposed, see for example WO 97/12355, or Ferroelectrics 1996, 179, 141–152, W. J. A. M. Hartmann, IEEE Trans. Electron. Devices 1989, 36 (9; Pt. 1), 1895–9.

Hartmann utilized a combination of the so-called "quasi-bookshelf geometry" (QBG) of an FLC and a TFT (thin-film transistor) active matrix to simultaneously achieve high response speed, gray shades and high transmission. However, the QBG is not stable over a broad temperature range, since the temperature dependence of the smectic layer thickness disrupts or rotates the field-induced layer structure. Moreover, Hartmann utilizes an FLC material having a spontaneous polarization of more than 20 nC/cm$^2$, which, for pixels having realistic dimensions of, for example, an area of 0.01 mm$^2$, leads to high electric charges (at saturation, Q=2 A P, A=pixel area, P=spontaneous polarization). With low-cost amorphous silicium TFTs, for example, these high charges cannot reach the pixel in the course of the opening time of the TFT. For these reasons, this technology has not been pursued any further to date.

While Hartmann utilizes the charge-controlled bistability to display a virtually continuous gray scale, Nito et al. have suggested a monostable FLC geometry (see Journal of the SID, 1/2, 1993, pages 163–169) in which the FLC material is aligned by means of relatively high voltages such that only a single stable position results from which a number of intermediate states are generated by application of an electric field via a thin-film transistor. These intermediate states correspond to a number of different brightness values (gray shades) when the cell geometry is matched between crossed polarizers.

One disadvantage of this technique is the occurrence of a streaky texture in the display which limits contrast and brightness of this cell (see FIG. 8 in the abovementioned citation). While it is possible to correct the disadvantageous streaky texture by treatment with a high electric voltage (20–50 V) in the nematic or cholesteric phase (see page 168 of the abovementioned citation), such a field treatment is unsuitable for mass production of screens and usually does not result in temperature-stable textures. Furthermore, this method produces switching only in an angle range of up to a maximum of once the tilt angle, which is about 22° in the case of the material used by Nito et al. (cf. p. 165, FIG. 6) and thus produces a maximum transmission of only 50% of the transmission of two parallel polarizers.

The object of the present invention is to provide a ferroelectric active matrix liquid crystal display comprising a ferroelectric liquid crystal mixture, where the liquid crystal mixture assumes a monostable position, but without forming a streaky texture, is temperature-stable and makes it possible to achieve a very high maximum transmission and a very high contrast.

This object is achieved according to the invention by a monostable ferroelectric active matrix display comprising a liquid-crystal layer, preferably in chevron C2 geometry, in the form of a monodomain having an unambiguously defined direction of the layer normal z of the chiral smectic phase, the ratio between the sum of pretilt angle and layer leaning angle and tilt angle (AR=(LLA+PTA)/TIA) being greater than 0.1 and the absolute value of the dielectric anisotropy DA being preferably less than 3.

The spontaneous polarization P in the liquid-crystal layer is preferably between 0.1 and 15 nC/cm$^2$.

The tilt angle TIA in the liquid-crystal layer is preferably between 9 and 40°.

The ratio between the product of anchoring strength and the sinus of the tilt angle and the spontaneous polarization (AS sin TIA/P) is preferably less than 20 V/$\mu$m.

The object is furthermore achieved by a monostable ferroelectric active matrix display comprising a liquid-crystal layer in chevron C1 geometry in the form of a monodomain having an unambiguously defined direction of the layer normal z of the smC* phase, the pretilt angle PTA being at least 5° and the ratio between pretilt angle and layer leaning angle (PTA/LLA) being greater than 0.7.

The object is furthermore achieved by a monostable ferroelectric active matrix display comprising a liquid-crystal layer in bookshelf geometry in the form of a monodomain having an unambiguously defined direction of the layer normal z of the smC* phase, the pretilt angle PTA being at least 1°.

The object is furthermore achieved by a monostable ferroelectric active matrix display comprising a liquid-crystal layer in the form of a monodomain having an unambiguously defined direction of the layer normal z of the smC* phase having the following properties:

a spontaneous polarization P of between 0.1 and 15 nC/cm$^2$, a tilt of 9° to 45° C.

an absolute value of the ratio between layer leaning angle and tilt angle of at least 0.2, a pitch in the chiral nematic (cholesteric) phase of at least 50 $\mu$m within the temperature range of 5° C. above the smectic-nematic phase transition or, if the range of existence of the nematic (cholesteric) phase is less than 5° C., within a temperature range of at least 80% of the nematic phase range, and an absolute value of the dielectric anisotropy DA of less than 3.

The liquid-crystal layer preferably has one or more, in particular all, of the following features:

the angle between the layer normal z of the smC* phase and the preferential direction n of the nematic or cholesteric phase (N* phase) is in the range from 0.5 to 1.0 times the smC* tilt angle, but at least 5°, the ferroelectric liquid-crystal layer has the phase sequence $$I^*-N^*-smC^*$$

where an smA* phase having a range of existence of not more than 20°, preferably not more than 1°, may exist between the N* phase and the smC* phase.

The active-matrix FLCD of the invention preferably comprises, as optically active layer, a ferroelectric liquid-crystalline medium (liquid-crystal phase) having a phase sequence of $$\text{isotropic–nematic or cholesteric }(N^*)\text{–smectic }C^*$$

or a phase sequence of $$\text{isotropic–nematic or cholesteric }(N^*)\text{–smectic }A^*\text{–smectic }C^*,$$

where the smectic A* phase has a range of existence (please range) of not more than 2° C., preferably not more than 1° C., particularly preferably not more than 0.5° C. The asterisk (*) attached to the phase name indicates a chiral phase.

The displays are preferably produced by a process, which comprises introducing the liquid-crystal layer into the space between a rubbed upper substrate plate and a rubbed lower substrate plate of the active matrix display, the rubbing directions on the upper substrate plate and the lower substrate plate being essentially parallel, and cooling the liquid crystal phase from the isotropic phase, an electric voltage being applied to the display at least during the N*→smC* or N*→smA*→smC* phase transition.

The FLC mixture is filled into an active matrix display. Production and components of an AM display of this type are described in the above-cited Tsukuda reference. However, in contrast to nematic displays, the thickness of the FLC layer is only from 0.7 to 2,5 $\mu$m, preferably 1–2 $\mu$m. Moreover, the rubbing directions on upper and lower substrate plates are essentially parallel. The term "essentially parallel" includes antiparallel rubbing directions or rubbing directions which are weakly crossed, i.e. up to 10%.

It is important for the operation of this display that in the production of the display, during controlled cooling, a direct electric current, preferably of less than 5V, is applied and maintained during the N*→smC* or N*→smA*→smC* phase transition, with the result that the whole display assumes a monostable monodomain which appears completely dark between crossed polarizers.

After this domain has been obtained, the direct current is switched off. In contrast to the abovementioned approach by Hartmann or conventional bistable FLCDs, the resulting texture is monostable. This means that the preferred n director (which indicates the preferential direction of the long axes of the molecules) is in the rubbing direction of the cell, whereas the z director (which indicates the preferential direction of the smectic layer normal) is oblique relative to the rubbing direction by approximately the tilt angle value. This constellation is exactly the opposite of the conventional bistable cell according to Clark and Lagerwall in which the z director is in the rubbing direction.

In contrast to Nito's approach, this is exactly the orientation in which there are no two layer normals and no two orientation domains, which ultimately lead to the unwanted streaky texture described above, but a single unambiguous direction of the z director and thus a single monodomain only. Furthermore, it is possible to obtain twice the tilt angle, which leads to 100% transmission, based on parallel polarizers, i.e. double brightness is achieved.

At a suitable angle of rotation, the resulting display appears completely dark between crossed polarizers. On applying an addressing voltage of only a few volts, the display appears bright, it being possible to vary the brightness continuously by means of the voltage, and is almost as bright as two parallel polarizing films when saturated. The angle between the preferential direction of the nematic (or cholesteric) phase and the layer normal (z director) is ideally and thus preferably equal to the tilt angle of the smectic C phase, or at least essentially equal to the tilt angle. For the purposes of the invention, "essentially" means preferably a range from half the tilt angle to the full tilt angle, particularly preferably from 0.5 to 1.0 times the tilt angle, but at least 5°.

The ferroelectric active matrix liquid crystal display of the invention is particularly useful in practice, in particular for TV, HDTV or multimedia, since it combines high transmission, short response times, gray scale and thus full color capability, low-cost production and a broad temperature range. Furthermore, the display can be operated at voltages of $\leq 10$ volts, preferably of $\leq 8$ V, particularly preferably of $\leq 5$ V.

For display of gray shades or as many natural colors as possible, the characteristic line (transmission plotted against voltage) of the liquid crystal mixture should be sufficiently flat to address the gray shades reliably using the available voltages, and the saturation voltage should not be too high.

The saturation voltage V90, at which 90% of maximum transmission are achieved, should not be too high so as to allow operation of the display at below 30 V, preferably below 15 V, more preferably below 10 V, particularly preferably below 8 V, especially below 5 V. The threshold voltage V10 should preferably be adapted to V90 so as to ensure that the the characteristic line width CLW is large enough to be able to address a sufficiently high number of gray shades. This is generally the case if the characteristic line width CLW=V90–V10 is at least 100 mV, preferably at least 200 mV, more preferably at least 500 mV, particularly preferably at least 1 V, especially at least 1.5 V.

Furthermore, the maximum transmission of the cell should be at least 40% (based on an empty cell between two parallel polarizing films), preferably at least 50%, more preferably at least 70%, particularly preferably at least 80%, especially at least 90%. Moreover, the T,V characteristic line should preferably increase strictly monotonically (with increasing voltage). A fall in transmission after reaching a transmission maximum is undesirable.

The invention accordingly provides the selection of liquid crystals and mixtures thereof having suitable material parameters for advantageous adjustment of the characteristic line.

The invention furthermore provides a monostable active matrix FLC display, in which an optimum characteristic line is achieved by selection of liquid crystals or mixtures thereof by specific combination of a plurality of material properties of the ferroelectric liquid crystal, and the use of liquid crystal mixtures having these properties for active matrix FLC displays.

In particular, the term "active matrix display" as used herein includes an LCD in which one of the two substrates is replaced by the rear side of an IC chip (IC=integrated circuit) as described, for example, in D. M. Walba, Science 270, 250–251 (1995).

The abbreviations used in the examples and in the description of the invention are explained in the table below.

| Definitions and abbreviations (abbr.): | | |
|---|---|---|
| Term | Abbr. | Unit |
| Anchoring strength | AS | $J/m^3$ |
| Tilt angle | TIA | Degrees |
| Pretilt angle | PTA | Degrees |
| Layer leaning angle | LLA | Degrees |
| Layer rotation angle | LRA | Degrees |
| Spontaneous polarization | P | $nC/cm^2$ |
| Threshold voltage | V10 | Volt |
| Saturation voltage | V90 | Volt |
| Dielectric anisotropy | DA | — |
| Optical anisotropy | OA | — |
| Characteristic line width (=V90–V10) | CLW | Volt |
| Characteristic line (optical transmission as a function of voltage) | — | — |
| Chevron 1 geometry (LLA > 0) | C1 | — |
| Chevron 2 geometry (LLA < 0) | C2 | — |
| Bookshelf geometry (ideally, LLA = 0) | BS | — |
| Pitch | pitch | $\mu m$ |
| Isotropic phase | 1 | — |
| Nematic or chiral nematic or cholesteric phase (these terms are used synonymously here) | N* | — |
| Smectic A phase or chiral smectic A phase | smA* | — |
| Chiral smectic C* phase | smC* | — |
| Cell thickness | d | $\mu m$ |
| Electric field (=voltage/cell thickness) | E | $V/\mu m$ |
| Free energy density | g | $J/m^3$ |
| Saturation transmission | Tsat | % |
| Optical transmission | T | % |
| Angle relation (AR = (LLA + PTA)/TIA) | AR | % |

The C1, C2 geometries etc. are described by D. C. Ulrich and S. J. Elston in Ferroelectrics, vol. 178, p. 177–186 (1996).

The characteristic line of the ferroelectric liquid crystal cell of the invention is influenced by a number of parameters which, alone or in combination, should be in preferred ranges so that optimum switching conditions are achieved. These parameters are in particular the spontaneous polarization (P), the tilt angle (TIA), the layer leaning angle (LLA), the pretilt angle (PTA), the anchoring strength (AS), the dielectric anisotropy (DA), furthermore the layer rotation angle (LRA), the cell thickness (d), the pitch of the cholesteric phase and the smectic C* phase and the optical anisotropy (OA).

It is found that all these parameters influence the characteristic line, although to a varying extent. The characteristic line (T,V) should preferably have the following characteristics.

In contrast to all usual experiences made with ferroelectric LCDs, it has been found that the characteristic line is not influenced, or influenced only to a small extent, by the rotational viscosity; instead, e.g. the saturation voltage V90 is strongly dependent on the spontaneous polarization (P) and the anchoring strength (AS).

The spontaneous polarization (P) should preferably be between 0.1 and 15 $nC/cm^2$ (here, this always means the absolute value of P), preferably between 0.2 and 10 nC/cm$^2$, more preferably between 0.4 and 8 nC/cm$^2$, particularly preferably between 0.5 and 6 nC/cm$^2$, especially between 0.8 and 3.5 nC/cm$^2$.

The tilt angle should preferably be in the range from 9° to 45°, preferably between 12° and 35°, more preferably between 14° and 31°, particularly preferably between 17° and 27°, especially between 19° and 25°.

The layer rotation angle (LRA=angle between the preferential direction of the nematic phase and the smC* layer normal) should preferably be at least 5°.

The absolute value of the dielectric anisotropy should preferably be less than 3 (three), more preferably less than 2.5, particularly preferably less than 1.8, especially less than 1.2.

The product of anchoring strength (AS) and the sinus of the tilt angle divided by the spontaneous polarization (P) should preferably be less than 20 V/µm, preferably less than 15 V/µm, more preferably less than 12 V/µm, particularly preferably less than 9 V/µm, especially less than 6 V/µm.

The parameter indications relate to at least one temperature in the operating range of the ferroelectric liquid crystal display.

The display of the invention can be operated not only in the range of the smectic C* phase, but also—at least partially—in the range of another tilted smectic phase, with the abovementioned properties being applied by analogy.

The monostable active matrix FLC display of the invention can be operated in chevron C1 geometry, chevron C2 geometry or bookshelf or quasi-bookshelf geometry, respectively. For all three geometries, the preferred combination of ranges of spontaneous polarization and tilt angle values is valid:

|  | Spontaneous polarization P Range in nC/cm$^2$ | Tilt angle TIA Range in degrees |
| --- | --- | --- |
| Preferably | <15 | 9–45 |
| More preferably | 0.2–10 | 12–35 |
| Particularly preferably | 0.4–8 | 14–31 |
| Very particularly preferably | 0.5–6 | 17–27 |
| Especially | 0.8–3.5 | 19–25 |

Even more preferred are abovementioned combinations of P and TIA together with an absolute value of the dielectric anisotropy which is less than 3 (three), more preferably less than 2 (two), particularly preferably less than 1.5, especially less than 1.2.

The pitch of the cholesteric helix should be at least 50 µm within the temperature range of 5° above the smectic phase transition or, if the range of existence of the cholesteric phase is smaller, preferably within a temperature range of 80% of this range of existence. It is preferred to achieve a pitch of at least 70 µm, particularly preferably of at least 100 µm, to achieve high contrasts.

In the C2 geometry, which is usually preferred at small pretilt angles and completely disappears at large pretilt angles in the limiting case (PTA>TIA), the layer leaning angle (LLA) together with the pretilt angle (PTA) should preferably relate to the tilt angle (TIA) as follows: the ratio AR between the sum of pretilt angle and layer leaning angle and the tilt angle (i.e. (LLA+PTA)/TIA) should generally be at least 0.1, preferably at least 0.15, more preferably at least 0.25, particularly preferably at least 0.5, especially at least 0.7. Here, the absolute value of the dielectric anisotropy DA should be less than 3.

Most particularly, advantageous characteristic lines are achieved using the combinations listed in the table below:

| C2 geometry | Spontaneous polarization P Range in nC/cm$^2$ | Tilt angle TIA Range in degrees | AR range |
| --- | --- | --- | --- |
| Preferably | <15 | 9–45 | greater than 0.1 |
| More preferably | 0.2–10 | 12–35 | greater than 0.15 |
| Particularly preferably | 0.4–8 | 14–31 | greater than 0.3 |
| Very particularly preferably | 0.5–6 | 17–27 | greater than 0.5 |
| Especially | 0.8–3.5 | 19–25 | greater than 0.7 |

Even more preferred are abovementioned combinations of P and TIA together with an absolute value of the dielectric anisotropy which is less than 3, more preferably less than 2, particularly preferably less than 1.5, especially less than 1.2.

The C2 geometry is generally preferred over C1 and bookshelf.

In the C1 geometry, which is preferred at large pretilt angles, the pretilt angle should be at least 5°, at a suitable layer leaning angle, since otherwise no switching occurs at low voltage.

At a suitable layer leaning angle, the relation between layer leaning angle (LLA) and pretilt angle (PTA) should advantageously be as follows: the ratio between pretilt angle and layer leaning angle should be greater than 0.7.

Most particularly, advantageous characteristic lines are achieved using the combinations listed in the table below (for C1 geometry):

|  | Spontaneous polarization P Range in nC/cm$^2$ | Tilt angle TIA Range in degrees | PTA/LLA range |
| --- | --- | --- | --- |
| Preferably | <15 | 9–45 | greater than 0.25 |
| More preferably | 0.2–14 | 12–35 | greater than 0.3 |
| Particularly preferably | 0.3–12 | 14–31 | greater than 0.33 |
| Very particularly preferably | 0.4–9 | 17–27 | greater than 0.4 |
| Especially | 0.5–7 | 19–25 | greater than 0.5 |

Even more preferred are abovementioned combinations of P and TIA together with a dielectric anisotropy which is greater than −1, preferably with a positive dielectric anisotropy, i.e. >0.

In the bookshelf geometry, which is herein defined for the range −5°<LLA>+5° (ideally LLA=0), the pretilt angle should generally be at least 1°, preferably at least 2°. Particulary preferably, the pretilt angle should be at least 1°, the spontaneous polarization should be at least 0.1 nC/cm$^2$ and not more than 15 nC/cm$^2$, and the tilt angle should be at least 12°.

In the tables above, the spontaneous polarization can also preferably be from 0.1 to 15 nC/cm$^2$.

A mixture which is particularly suitable for use in the display of the invention comprises at least six (6), preferably at least eight (8), particularly preferably at least nine (9), especially at least eleven (11), components which are selected such that the spontaneous polarization is between 0.1 and 15 nC/cm$^2$, the tilt angle is between 17 and 27°, the ratio between layer leaning angle and tilt angle is at least 0.3, the pitch of the chiral nematic phase is at least 50 µm (range of 5° C. above the phase transition), the absolute value of the dielectric anisotropy is less than 3, and the phase sequence is isotropic–nematic–smectic C* or isotropic–nematic–smectic A–smectic C*, where the smectic A phase has a range of existence of not more than 2° C.

The examples which follow illustrate the invention.

EXAMPLES

1. Preparation of an aligned, monostable FLC cell:

A glass substrate coated with transparent conductive indium-tin oxide is structured in a photolithographic process to give an electrode pattern. The transparent conductor tracks of this electrode pattern are used for electrical addressing of the display by menas of a function generator, thus simulating the swtiching behavior of a thin-film transistor. Two glass plates structured in this way, forming the top and bottom of the display—i.e. the outer plates—are provided with alignment layers which are rubbed and joined with the aid of an adhesive frame with addition of a concentration of 0.5% by weight of spacer beads having a diameter of 1.3 μm. The adhesive is hardened by careful heating, the liquid-crystal mixture is filled in at 100° C. by capillary forces, and the cell is slowly cooled to a temperature above the I-N* phase transition. At this temperature, a direct voltage of 4 V is applied and the cooling process is continued until a temperature of 22° C. is reached. The direct voltage is then switched off. A monostable monodomain is obtained which appears completely dark between crossed polarizers.

2. Determination of the characteristic line (T,V characteristic):

Voltages of variable amplitude are applied to the cell by means of function generator (Wavetech model) and amplifier (from Krohn-Hite) using monopolar pulses of 10 ms duration at 30 ms intervals, and the transmission is measured by means of a photodiode and an oscilloscope. In this way, the transmission is obtained (as a photodiode signal) as a function of voltage. This characteristic line usually exhibits a saturation of transmission at high voltages; this value is denoted 100%. V10 is the threshold voltage at which the brightness is exactly 10% of the saturation transmission, V90 is the voltage at which 90% of the saturation transmission are achieved.

3. Determination of anchoring strength (AS)

The empirical anchoring strength AS is calculated from the V90 value obtained in Example 2, the layer thickness and the spontaneous polarization according to the formula below:

$$AS(\text{in } J/m^3) = 10 * V90 \text{ (in } V) * P(\text{in } nC/cm^2)/\sin(TIA) * d(\text{in } \mu m)$$

Once the AS value has been determined for one mixture and one cell type, it is possible to vary P, d or other parameters, provided the chemical nature of the composition of the mixture is not changed too much and thus the AS value can be applied to the design of an AM-FLC display.

4. An FLC display having a cell thickness of 1.25 μm is filled with an FLC mixture which has the phase sequence I-N*-smC* and the following physical data:

| | |
|---|---|
| Geometry: | C2 |
| Tilt angle: | 21° |
| Layer leaning angle: | 18° |
| LLA/TIA: | 0.86 |
| Pretilt angle: | 0° |
| Optical anisotropy: | 0.17, | and aligned.

Variation of P and AS yields the following T,V characteristics (characteristic lines):

| No. | P nC/cm² | AS J/m³ | V10 V | V90 V | CLW = V90–V10 V |
|---|---|---|---|---|---|
| A | 0.5 | 83 | 2.5 | 8.0 | 5.5 |
| B | 2 | 195 | 2.4 | 4.4 | 2.0 |
| C | 4 | 195 | 0.8 | 2.2 | 1.4 |
| D | 8 | 195 | 0.5 | 1.1 | 0.5 |
| E | 16 | 195 | 0.2 | 0.5 | 0.3 |
| F | 0.1 | 7 | 1.2 | 3.6 | 2.4 |

Advantageous switching is possible in a P range from 0.1 to 15 nC/cm², at low P values, however, preferably combined with weak anchoring.

5. An FLC display having a cell thickness of 1.25 μm is filled with an FLC mixture which has the phase sequence I-N*-smC* and the following physical data:

| | |
|---|---|
| Geometry: | C2 |
| Pretilt angle: | 0° |
| Optical anisotropy: | 0.17, | and aligned.

Variation of the tilt angle TIA yields the following characteristic lines:

| No. | P nC/cm² | LLA Deg. | TIA Deg. | V10 V | V90 V | CLW = V90–V10 V | Tsat % |
|---|---|---|---|---|---|---|---|
| A | 0.5 | 18 | 21 | 2.5 | 8.0 | 5.5 | 68 |
| B | 3   | 18 | 24 | 0.6 | 1.5 | 0.9 | 72 |
| C | 3   | 18 | 27 | 0.7 | 1.7 | 1.0 | 70 |
| D | 3   | 18 | 30 | 0.8 | 1.8 | 1.0 | 52 |
| E | 1.5 | 5  | 35 | 3.0 | 3.3 | 0.3 | 34* |
| F | 1.5 | 30 | 35 | 0.8 | 4.5 | 3.7 | 55** |
| G | 1.5 | 10 | 12 | 0.3 | 1.2 | 0.9 | 42 |
| H | 1.5 | 5  | 10 | 0.7 | 1.5 | 0.8 | 60 |
| I | 1.5 | 10 | 15 | 0.6 | 1.8 | 1.2 | 58 |
| J | 1.5 | 14 | 15 | 0.5 | 1.9 | 1.4 | 56 |
| K | 1.5 | 3  | 9  | 0.3 | 0.8 | 0.5 | 28 |
| L | 1.5 | 35 | 40 | 0.5 | 5.0 | 4.5 | 50 |

*here, pretilt = 5°,
**with intermediate maximum at 5 V/73%.

Advantageous switching is possible in a TIA range from 10° to 35°. In these examples, the product of optical anisotropy and cell thickness was not optimized, resulting in a maximum transmission of only about 80%.

By adapting e.g. the cell thickness, all maximum transmissions obtained here can be increased by a factor of 1.25, giving almost 100% with the preferred configurations.

6. An FLC display having a cell thickness of 1.25 μm is filled with an FLC mixture which has the phase sequence I-N*-smA* (range of existence: <2°)-smC* and the following physical data:

| | |
|---|---|
| Geometry: | C2 |
| Dielectric anisotropy: | −1 |
| Optical anisotropy: | 0.17, | and aligned.

Variation of LLA and PTA yields the following T,V characteristics (characteristic lines); AR=(LLA+PTA)/TIA:

| No. | P nC/cm² | LLA Deg. | TIA Deg. | PTA Deg. | AR — | V10 V | V90 V | CLW = V90–V10 V |
|---|---|---|---|---|---|---|---|---|
| A | 1.5 | 5  | 25 | 20 | 1.00  | 1.2 | 3.0 | 1.8 |
| B | 1.5 | 5  | 25 | 5  | 0.40  | 1.7 | 2.8 | 1.1 |
| C | 1.5 | 5  | 25 | 5  | 0.40  | 3.3 | 5.0 | 1.7 |
| D | 1.5 | 20 | 25 | 5  | 1.00  | 2.2 | 6.0 | 3.8 |
| E | 1.5 | 5  | 35 | 5  | 0.28  | 2.9 | 3.4 | 0.5 |
| F | 2.0 | 0  | 21 | 3  | 0.13  | 1.2 | 1.5 | 0.3 |
| G | 2.0 | 1  | 30 | 1  | 0.07  | —   | —   | no switching |
| H | 2.0 | 1  | 31 | 2  | 0.096 | —   | —   | no switching |
| J | 2.0 | 5  | 21 | 0  | 0.24  | 2.4 | 3.1 | 0.7 |

Advantageous switching is possible in a range of AR>0.1. At lower values, the characteristic line is too steep to realize gray shades, or even no switching at all is observed.

7. An FLC display having a cell thickness of 1.25 μm is filled with an FLC mixture which has the phase sequence I-N*-smC* and the following physical data:

| | |
|---|---|
| Geometry: | C2 |
| Tilt angle: | 25° |
| Layer leaning angle: | 15° |
| LLA/TIA: | 0.60 |
| Pretilt angle: | 0° |
| Dielectric anisotropy: | −1 |
| Optical anisotropy: | 0.17 |
| Spontaneous polarization: | 1,5 nC/cm², | and aligned.

Variation of AS yields the following T,V characteristics (characteristic lines):

| No. | AS J/m³ | V10 V | V90 V | CLW = V90–V10 V |
|---|---|---|---|---|
| A | 74  | 1.2 | 2.6 | 1.4 |
| B | 159 | 2.5 | 5.6 | 3.1 |
| C | 43  | 0.6 | 1.5 | 0.9 |
| D |     |     |     |     |
| E | 2   | 0.2 | 0.7 | 0.5* |
| F |     |     |     |     |

*here, Ps = 0.75 nC/cm²

Advantageous characteristic lines are obtained at low values of AS*sin(TIA)/P, in particular at AS*sin(TIA)/P<20 V/μm, preferably <16 μm.

8. An FLC display having a cell thickness of 1.25 μm is filled with an FLC mixture which has the phase sequence I-N*-smC* and the following physical data:

| | |
|---|---|
| Geometry: | C2 |
| Tilt angle: | 22° |
| Layer leaning angle: | 15° |
| LLA/TIA: | 0.682 |
| Pretilt angle: | 0° |
| Optical anisotropy: | 0.17 |
| Spontaneous polarization: | 0,5 nC/cm², | and aligned.

| No. | DA | V10 V | V90 V | Tsat % | Notes |
|---|---|---|---|---|---|
| A | +3.2 | — | — | 4% | virtually no switching |
| B | −3.1 | — | — | 9% | virtually no switching |
| C | 0 | 3 | 8 | 78% | |
| D | +0.5 | 0.8 | 2.0 | 75% | here, Ps = 2 nC/cm² |

Adavantageous characteristic lines are obtained at low absolute values of the dielectric anisotropy, in particular at |DA|<3, preferably at |DA|<2, particularly preferably at |DA|<1.5, especially at |DA|<1.2.

9. An FLC display having a cell thickness of 1.25 μm is filled with an FLC mixture which has the phase sequence I-N*-smC* and the following physical data:

| | |
|---|---|
| Geometry: | C1 |
| Spontaneous polarization: | 1.5 nC/cm² |
| Tilt angle: | 20° |
| Layer leaning angle: | 15° (C1, leaning direction different to C2) |
| LLA/TIA: | 0.75 |
| Dielectric anisotropy: | −1 |
| Optical anisotropy: | 0.17, | and aligned.

Variation of the pretilt angle yields the following T,V characteristics (characteristic lines):

| No. | PTA Degrees | V10 V | V90 V | CLW = V90−V10 V |
|---|---|---|---|---|
| A | 0 | no switching | | |
| B | 10 | no switching | | |
| C | 20 | 1.6 | 1.8 | 0.2 |
| D | 25 | 2.2 | 2.5 | 0.3 |
| E | 30 | 2.3 | 3.1 | 0.8 |
| F | 40 | 2.4 | 4.0 | 1.6 |

In C1 geometry, no switching is observed at small pretilt angles. At an acceptable minimum value of the tilt angle of more than 9°, a pretilt of at least 5° is required to obtain a useful characteristic line.

If the layer leaning angle is adjusted to less than 5° (absolute value), switching is only observed at a pretilt angle of at least one degree.

PTA is at least 5°; PTA/LLA is greater than 0.7.

What is claimed is:

1. A monostable ferroelectric active matrix display comprising a liquid-crystal layer in the form of a monodomain having an unambiguously defined direction of the layer normal z of the smC* phase, the ratio between the sum of pretilt angle and layer leaning angle and the tilt angle (AR=(LLA+PTA)/TIA) being greater than 0.1 and the absolute value of the dielectric anisotropy DA being less than 3.

2. An active matrix display as claimed in claim 1 wherein the spontaneous polarization P in the liquid-crystal layer is less than 15 nC/cm2.

3. An active matrix display as claimed in claim 1 wherein the tilt angle TIA in the liquid-crystal layer is between 9 and 40°.

4. An active matrix display as claimed in claim 1 wherein the ratio between the product of anchoring strength and the sinus of the tilt angle and the spontaneous polarization (AS sin TIA/P) is less than 20 V/μm.

5. An active matrix display as claimed in claim 1 wherein the liquid-crystal layer has one or more of the following properties:

the angle between the layer normal z of the smC* phase and the preferential direction n of the nematic or cholesteric phase (N* phase) is in the range from 0.5 to 1.0 times the smC* tilt angle, but at least 5°, the ferroelectric liquid-crystal layer has the phase sequence $$I^*-N^*-smC^*$$

where an smA* phase having a range of existence of not more than 2° may exist between the N* phase and the smC* phase.

6. A process for producing an active matrix display as claimed in claim 1 which comprises introducing the liquid-crystal layer into the space between a rubbed upper substrate plate and a rubbed lower substrate plate of the active matrix display, the rubbing directions on the upper substrate plate and the lower substrate plate being essentially parallel, and cooling the liquid crystal phase from the isotropic phase, an electric voltage being applied to the display at least during the N*smC* or N*smA*smC* phase transition.

7. An active matrix display obtainable by the process as claimed in claim 6.

8. A monostable ferroelectric active matrix display comprising a liquid-crystal layer in chevron C1 geometry in the form of a monodomain having an unambiguously defined direction of the layer normal z of the smC* phase, the pretilt angle PTA being at least 5° and the ratio between pretilt angle and layer leaning angle (PTA/LLA) being greater than 0.7.

9. A monostable ferroelectric active matrix display comprising a liquid-crystal layer in bookshelf geometry in the form of a monodomain having an unambiguously defined direction of the layer normal z of the smC* phase, the pretilt angle PTA being at least 1°.

10. A monostable ferroelectric active matrix display comprising a liquid-crystal layer in the form of a monodomain having an unambiguously defined direction of the layer normal z of the smC* phase having the following properties:

a spontaneous polarization P of between 0.1 and 15 nC/cm2, a tilt angle TIA of 9° to 45° C.

an absolute value of the ratio between layer leaning angle and tilt angle of at least 0.2, a pitch in the chiral nematic (cholesteric) phase of at least 50 μm within the temperature range of 5° C. above the smectic-nematic phase transition, and an absolute value of the dielectric anisotropy DA of less than 3.

* * * * *